No. 814,128. PATENTED MAR. 6, 1906.
W. GATWOOD.
POCKET FOR DRAW BARS.
APPLICATION FILED JAN. 12, 1905.
3 SHEETS—SHEET 1.
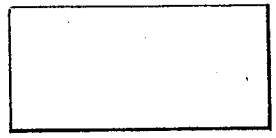
Fig. 1. Fig. 1ª
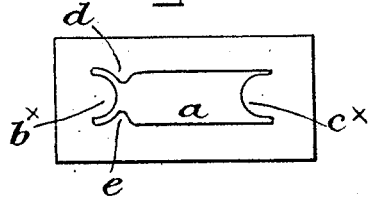
Fig. 2.
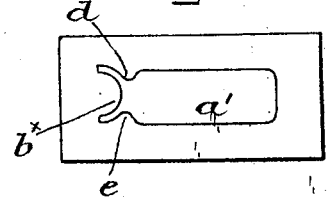
Fig. 3.
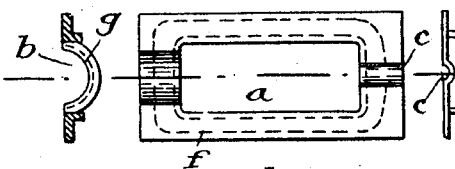
Fig. 5. Fig. 4. Fig. 7.
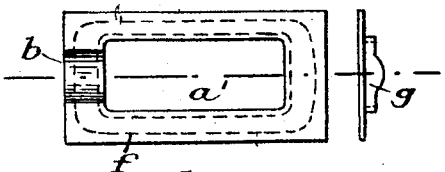
Fig. 8. Fig. 9.
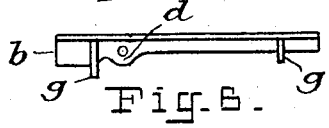
Fig. 6.
Fig. 10.
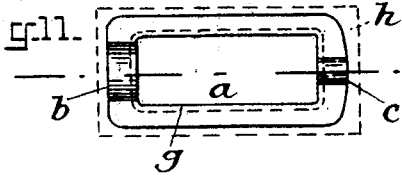
Fig. 11.
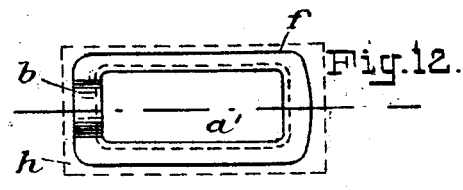
Fig. 12.
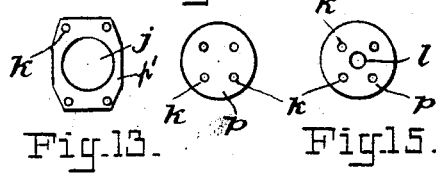
Fig. 14.
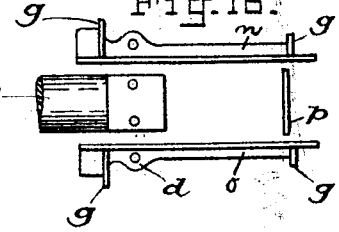
Fig. 16.
Fig. 13. Fig. 15.
SCALE
Witnesses:
J. B. Bolton
V. M. Kuehne
Inventor:
Walter Gatwood
By Richards
his Attorneys.

No. 814,128. PATENTED MAR. 6, 1906.
W. GATWOOD.
POCKET FOR DRAW BARS.
APPLICATION FILED JAN. 12, 1905.
3 SHEETS—SHEET 2.
Fig. 17.
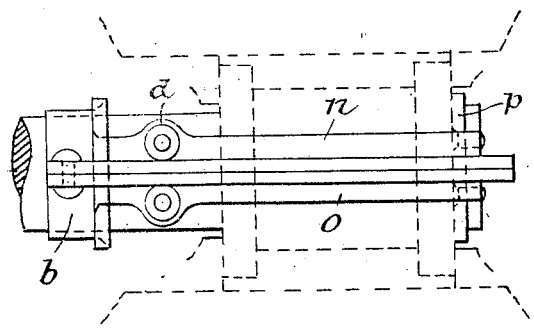
Fig. 18. Fig. 19.
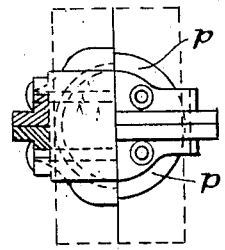
Fig. 20.
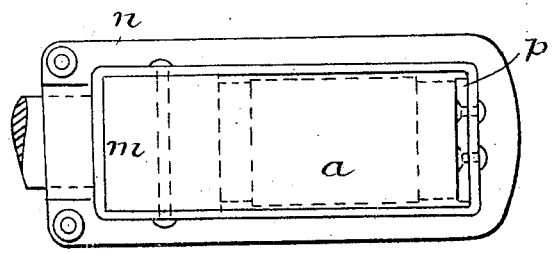
Fig. 21.
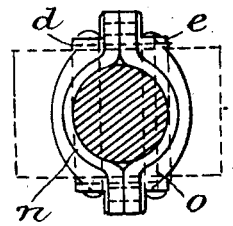
SCALE
Witnesses.
E. B. Bolton
H. W. Kuehne
Inventor:
Walter Gatwood
By 
his Attorneys No. 814,128. PATENTED MAR. 6, 1906.
W. GATWOOD.
POCKET FOR DRAW BARS.
APPLICATION FILED JAN. 12, 1905.
3 SHEETS—SHEET 3.

SCALE
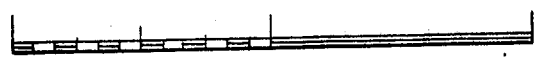
Inventor:
Walter Gatwood
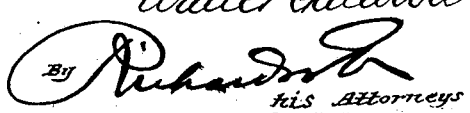
By Richardson
his Attorneys
Witnesses:
E. B. Bolton
H. M. Kuhne

UNITED STATES PATENT OFFICE.

WALTER GATWOOD, OF MANCHESTER, ENGLAND.

POCKET FOR DRAW-BARS.

No. 814,128.   Specification of Letters Patent.   Patented March 6, 1906.

Application filed January 12, 1905. Serial No. 240,841.

*To all whom it may concern:*

Be it known that I, WALTER GATWOOD, a subject of the King of Great Britain, residing at 9 Cavendish road, Chorlton-cum-Hardy, Manchester, in the county of Lancaster, England, have invented new and useful Improvements in the Construction of Pockets for Draw-Bars, of which the following is a specification.

The objects of this invention are to provide a better method of securing pockets to draw-bar shanks, so as to grip all around them and form when in position a complete frame to reduce their weight and to obtain greater tensile strength.

The invention is illustrated in the accompanying drawings, in which—

Figure 22:
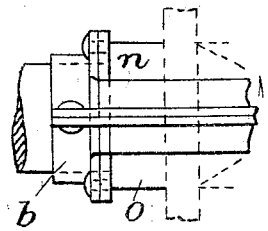
Figure 24:
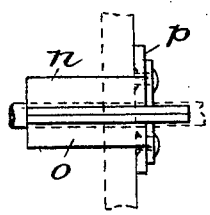
Figure 25:
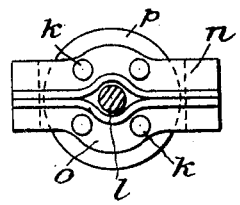
Figure 23:
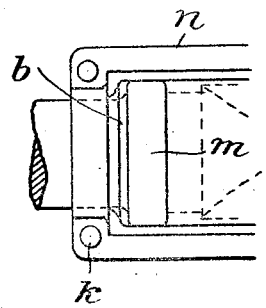
Figure 26:
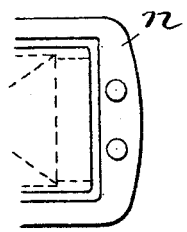
Figure 27:
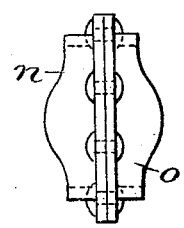
Figure 28:
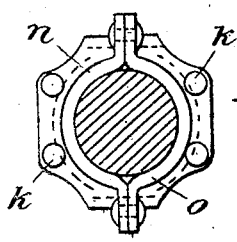

Figures 1 and 1ª are a plan view and an end elevation, respectively, of a steel or iron plate from which a rectangular-shaped pocket can be made. Fig. 2 is a plan view of a plate after the first operation of punching. Fig. 3 is a like view of a modified form of plate. Figs. 4, 5, 6, and 7 are a plan view, a front end view, a side elevation, and a rear end view, respectively, after the second or flanging operation of the said plate. Figs. 8, 9, and 10 are a plan view, an end elevation, and a side elevation, respectively, of a plate similar to that at Figs. 4, 5, 6, and 7, having a depression at its fore end only. Figs. 11 and 12 are plan views of such flanged pocket frame-plates after the third or shearing operation, the dotted line $h$ indicating the original shape of the plate. Fig. 13 is an end elevation in halves of a strengthening-plate for the fore end of such pocket-frames. Figs. 14 and 15 are end views of circular-shaped pockets. Fig. 16 is a plan view of a method of fitting a draw-bar shank between two plates, forming a pocket-frame and the strengthening-plate $p$ at their rear ends. Fig. 17 is a side elevation of two plates riveted together and secured to a shank of a draw-bar with the ordinary arrangement of follower-plate, spring, and spring-plate stops. Fig. 18 is a sectional elevation of one portion or side of a pocket-frame looking in the direction of the arrow, Fig. 17. Fig. 19 is a rear end elevation of one half or side of the pocket-frame showing at Fig. 17. Fig. 20 is a plan view thereof. Fig. 21 is a transverse sectional elevation through the draw-bar shank $c$ at the fore end of the cradle. Figs. 22 and 23 are a side elevation and plan view, respectively, of the fore end portion of a pocket-frame, showing an alternative method of securing such pocket-frames without bolts or rivets passing through the draw-bar shank. Figs. 24 and 25 are a side elevation of a portion of the rear end and an end elevation, respectively, of a pocket-frame, showing the general arrangement when a draw-bar bolt is used. Figs. 26 and 27 are a plan view of the rear end portion and an end elevation of a pocket-frame without a strengthening-plate and draw-bar bolt, and Fig. 28 a transverse sectional elevation through a circular draw-bar shank and fore end elevation of pocket-frame shown at Figs. 22, 23.

According to my invention I take two plates of mild steel or wrought-iron of suitable shape and size, such as shown in Figs. 1 and 1ª, which I heat separately to a suitable temperature, and then by any suitable tool punch a hole therein, such as that shown at $a$ in Fig. 2, or as that shown in Fig. 3 at $a'$. As shown in Fig. 2, the hole is so formed as to leave a portion $b^\times$ at its fore end and a portion $c^\times$ at its rear end to enable the flanges to be formed around their large and small end depressions, the projections $d$ and $e$ forming lugs for bolts or rivets when turned up. In Fig. 3 the portion $c$ is omitted. I then form a flange $g$ around the sides and ends of said hole and at the same time form a semicircular or other shaped longitudinal depression $b\ c$ at each end of the plates. In the plate shown in Figs. 3, 8, 9, 10, and 12 only one end is depressed. I then cut or shear the plates on the line $f$ by means of a suitable tool. The plates are now ready to be assembled to form the pockets. To so assemble the parts, I take two plates $n\ o$ (see Fig. 16) and place them on each side of a draw-bar C, so that the depression $b$ will grip the bar behind the shoulder $m$ on its shank and then connect the plates to each other by suitable bolts or rivets. Where a rear draw-bar is to be used, plates having depressions $c$ are used. To further increase the strength of such frame-pockets, I rivet a circular or other shaped plate $p$, having a hole $l$, when a rear draw-bar is to be used, to the rear flanged end of the plates within the opening $a$. If desired, a similar plate $p'$, but in halves with a hole $j$ therein for the passage of the draw-bar, may be riveted to the flanges at the front of the plates within the opening $a$.

The fore end of the frame-pockets can be made to suit any section of draw-bar and their rear end to carry any required arrangement of follower or spring plate, and being weldless all strains are resisted by solid frames which can be used with the ordinary arrangement of draw and buffing gear, no alterations being required to the standard couplers or the spring and spring buffer-plates.

What I claim is—

The herein-described method of making pocket-frames for draw-bars consisting in first punching a hole in the plate then forming a central longitudinal depression in one end thereof, then forming a flange around the hole and finally placing two plates around a draw-bar and securing them together.

In testimony whereof I have signed my name to this specification in the presence of two subscribing witnesses.

WALTER GATWOOD.

Witnesses:
 FREDERICK GEORGE HAYNES,
 PAUL LORD GIBSON.